United States Patent
Steiner, Jr. et al.

(10) Patent No.: US 6,174,403 B1
(45) Date of Patent: Jan. 16, 2001

(54) MULI-LAYERED AND COLORED SHINGLE AND METHOD OF MAKING SAME

(75) Inventors: Edward C. Steiner, Jr., Hillsborough County; Shelby L. Freeman, Pinellas County; Walter F. Becker, Pinellas County; Calvin G. Trotter, Pinellas County, all of FL (US)

(73) Assignee: CertainTeed Corporation, Valley Forge, PA (US)

(*) Notice: Under 35 U.S.C. 154(b), the term of this patent shall be extended for 0 days.

(21) Appl. No.: 09/148,844

(22) Filed: Sep. 4, 1998

Related U.S. Application Data (63) Continuation-in-part of application No. 08/689,298, filed on Aug. 8, 1996, now abandoned.

(51) Int. Cl.[7] ............................. B32B 31/00; E04D 5/00
(52) U.S. Cl. ...................... 156/260; 156/264; 156/270; 156/271; 156/512; 52/518; 52/557; 52/DIG. 16; 427/187; 427/197; 427/188; D25/139
(58) Field of Search ........................... 156/259, 260, 156/264, 270, 271, 279, 512, 544; 83/920; 52/518, 557, DIG. 16; 427/187, 197, 188; D25/139; 144/13

(56) References Cited

U.S. PATENT DOCUMENTS

| | | | |
|---|---|---|---|
| 1,153,418 | 9/1915 | Bird ........................................ 52/518 |
| 1,698,891 | 1/1929 | Overbury ................................ 29/412 |
| 1,829,886 | 11/1931 | Yates et al. .......................... 156/260 |
| 1,897,139 | 2/1933 | Overbury ................................ 156/93 |
| 3,180,783 | 4/1965 | Walker et al. ........................ 428/148 |
| 3,624,975 | 12/1971 | Morgan et al. ........................ 52/105 |
| 3,921,358 | 11/1975 | Bettoli ..................................... 52/314 |
| 3,998,685 | 12/1976 | Czyzewski et al. .................. 156/260 |
| 4,198,257 | 4/1980 | Pfaff ..................................... 156/260 |
| 4,233,100 | 11/1980 | Cunningham et al. .............. 156/260 |
| 4,274,243 | 6/1981 | Corbin et al. ....................... 52/748.1 |
| 4,352,837 | * 10/1982 | Kopenhaver ........................ 427/187 |
| 4,717,614 | 1/1988 | Bondoc et al. ...................... 428/143 |
| 4,869,942 | 9/1989 | Jennus et al. ........................... 428/77 |
| 5,181,361 | 1/1993 | Hannah et al. ........................ 52/535 |
| 5,186,980 | 2/1993 | Koschitzky .......................... 427/187 |
| 5,375,387 | 12/1994 | Davenport ............................. 52/557 |
| 5,426,902 | 6/1995 | Stahl et al. ............................. 52/314 |
| 5,666,776 | 9/1997 | Weaver et al. ......................... 52/557 |

FOREIGN PATENT DOCUMENTS 963626   3/1975  (CA) .

OTHER PUBLICATIONS

Product Literature of GS Roofing, Estate, May, 1996, attached.

* cited by examiner

Primary Examiner—Linda L. Gray (57) ABSTRACT

A method for the production of a laminated shingle wherein at least two strips of a continuously advancing sheet are coated with differently colored aggregates of granules. Present among one of the aggregates are a multitude of granules having at least one color and/or hue thereof not present among the granules of the other aggregate or aggregates. The strips are cut from the sheet and laminated one above the other so as to form at least two layers with the differently colored aggregates exposed to view. The difference in coloration creates a pleasing color contrast and accentuates the difference in elevation between the shingle layers.

5 Claims, 4 Drawing Sheets

MULI-LAYERED AND COLORED SHINGLE AND METHOD OF MAKING SAME

This is a continuation-in-part of application Ser. No. 08/689,298, filed Aug. 8, 1996 abandoned.

BACKGROUND OF THE INVENTION

1. Field of the Invention

This invention relates to a method for making multi-layered shingles, and to roofing shingles made thereby. The shingles are uniquely colored and thickened to enhance the appearance of a roof.

2. Description of the Prior Art

There have been many approaches by the roofing industry to the task of covering a roof deck with shingles which are both protective and aesthetically pleasing. Whatever their appearance, suitable shingles have been made sufficiently durable and weatherproof for prolonged protection of the roof. The shingles' visual appeal has been attained in various ways, such as by providing particular butt edge contours and surface treatments which function to simulate more traditional, and in most cases more expensive, forms of roof coverings, including thatch, wooden shakes, slates, and even tiles of various forms.

Simulation of such more traditional roof coverings is afforded by asphalt shingles of the laminated type. These shingles provide depth or its appearance on the roof, thus more or less giving the look of the wood or other natural appearing shingles. U.S. Pat. No. 3,921,358 provides an example of such composite shingles. After describing the futile attempts in the past to achieve the irregular, bulky, butt edge profile and surface contour characteristic of wood roofing shingles, this patent presents an improved composite shingle comprising a rectangular sheet having a headlap portion and a butt portion. The butt portion is divided into a series of spaced apart tabs and a strip is secured to the sheet in a position underlying the tabs and filling the spaces therebetween. While the resultant bilaminate structure suggests somewhat the substantial and imposing architectural appearance of the more expensive roofing materials, such as wood shingles, the structure still diverges considerably in appearance from them.

For many years roofing manufacturers have offered a variety of two-layered shingles of the type disclosed in U.S. Pat. No. 3,921,358 in the attempt to present a thicker and more attractive appearance. A structure markedly different from these prior art bilaminate shingles is shown in U.S. Pat. No. 4,869,942. This structure, which has an exposed butt portion three layers in depth, with tabs and cut-outs two layers in depth and an additional strip under the cut-outs, gives the shingle an appearance that goes well beyond the bilaminates in simulating wood and tile shingles.

Although the asphalt composite shingles have significant cost, service life and non-flammability advantages over wood shingles, the latter type are still seen by many to be a much more desirable roofing material for aesthetic purposes. A key reason for wood shingles' continuing aesthetic appeal stems from their greater thickness relative to the composite shingles, in spite of the many efforts in the past to simulate this thickness. Accordingly, it would be most beneficial to find a way to enhance the appearance of depth in the composite shingles without sacrificing these shingles' advantageous features.

OBJECTS OF THE INVENTION

It is therefore an object of the invention to provide an asphalt shingle that simulates very closely the thickness of wood or other traditional roof coverings, and also possesses those attributes desired in roof coverings, including waterproofness, durability and fire-resistance.

It is a further object of the invention to enhance the appearance of di-, tri- or other multi-thick laminated shingles through the use of granules having contrasting colors.

It is another object of the invention to provide a decorative trilaminated shingle wherein colored granules enhance the shingle's appearance and make it look thicker than it actually is.

It is yet another object of the invention to provide a simple, efficient and economical method for the continuous production of a laminated shingle from a single indefinitely long roofing sheet.

SUMMARY OF THE INVENTION

The foregoing and other objects of the invention have been achieved by a multi-layered roof shingle which is colored for enhancement of the shingle's visual appeal and thickness. The shingle has two or more layers which have different elevations and are provided with differently colored granules. Contrasting the layers by means of color variation greatly accentuates the difference in surface elevation between them. These differently colored layers are the shingle portions which are exposed to view when the shingles are laid together in overlapping relation on a roof.

In a preferred embodiment of the invention, the multi-layered shingle is of the laminated type, e.g., a bi- or tri-laminated roofing shingle. This shingle composite is made of at least two laminae, and may have three, four or more laminae. The laminae are preferably constructed of felted material comprising organic or inorganic fibers or a mixture of both. The fibers are usually held together with a binder and are coated, saturated, or otherwise impregnated with an asphaltic bituminous material. The laminae lie one above another in the composite, and at least one underlying lamina is visible when the composite is viewed from above. Inherent in this laminated construction is an appreciable difference in surface elevation where the underlying lamina or laminae are exposed below the overlying one. The use of differently colored granules in accordance with the invention to differentiate the over- and underlying laminae creates an enhanced impression of depth to the composite's viewer.

A preferred laminate incorporating the distinctive coloration of the invention comprises an asphalt shingle having a beadlap portion and a butt portion which extends from the lower boundary of the headlap portion to the butt edge of the shingle and comprises a series of tabs separated by spaces extending from the headlap portion to the butt edge, with an underlay member being positioned beneath and affixed to the tabs and filling the spaces therebetween. The tabs and/or the underlay member may be multi-layered. The type of laminated shingle consisting of a single overlay member and a single underlay member is well-known and illustrated, for example, in U.S. Pat. Nos. 3,921,358 and 4,717,614. In the past, the application of a mineral granule covering having randomly varying color contrasts or hues has been used to enhance the effects of the shape of such bilaminated shingles and thereby present a generally randomly varying surface simulating cedar or wood shake roofing elements.

The coloration of the inventive multi-layered shingles departs from this variegated look of the prior art. The shingle of the present invention has at least two layers which are at different elevations and individually have a surface exposed to view in the final assembly of shingles on the roof deck.

While each such surface may be either randomly or systematically colored, at least one of the surfaces is colored differently from the other(s) which is (are) at a different elevation. The differently colored surface(s) beneficially is (are) covered by granular material having at least one color and/or hue which is not possessed by the granules of the other exposed surface or surfaces. The color differentiation strikingly accentuates the difference in height between the shingle layers. The coloring scheme is especially useful for the preferred laminated shingles whose exposed butt portion presents to the viewer alternating tabs and cut-out spaces backed by an underlying strip in the final roof covering constituting a plurality of the shingles. By creating a high color contrast between the overlying tabs and underlying strip, the overall appearance of thickness is greatly enhanced.

The underlying strip may have one dark band across its topmost exposed surface to create a shadow line. This positioning of a single dark bank under the sawtooth edge of a shingle is a conventional practice in the art. However, the strip does not have a plurality of exposed horizontal striations to create an illusion of depth or thickness. There is no color gradient or gradation such as that disclosed in U.S. Pat. No. 5,666,776.

In accordance with the process of the invention, one or more fibrous sheets, which are to be made into the shingles, are treated with a cementitious waterproofing composition, such as asphalt or other bituminous material. The treatment includes surfacing the sheet or sheets with sufficient waterproofing material to adhere thereto granules such as crushed rock, slate or other surfacing material. While the entire outer face of the shingle, i.e. the face which is uppermost when the shingle lies on a roof, is desirably covered over its fill extent with granular matter, the portion of the outer face which is important for colorful effects is that portion which is exposed to view when the shingles are laid together in overlapping courses on a roof. Accordingly, the sheet portions which ultimately become these exposed portions are profitably surfaced with colorful granules so as to provide areas of distinctive coloration, and lower cost, less decorative granular material is employed to surface the sheet portions which are to become the covered or hidden areas of the final assemblage.

The process is advantageously carried out continuously with the sheet(s) being transported along a production line for sequential processing. The continuous process is especially useful in the production of laminated shingles from a single elongate sheet. The distinctively different coloration between the layers of the finished shingles is readily attained by applying at least two differently colored coatings of granules to the continuously advancing sheet(s). One coating comprises an aggregate of colored granules having one or more colors and at least one other coating comprises a second aggregate of differently colored granules having one or more colors. The color difference is established by the presence among the granules of at least one of the aggregates of a multitude of granules having at least one color and/or hue thereof which is not present among the granules of the other aggregate.

Each of these coatings is deposited on the sheet in the form of a continuous strip or zone extending lengthwise over the sheet's extent. Thereafter, a plurality of individual shingle layers are cut from each differently colored strip. For example, in the construction of the preferred shingles having an overlay of cut-out tabs of one color, and an underlying exposed base of a different color, the process includes cutting the sheet along its longitudinal dimension so as to form therefrom the requisite differently colored, elongate tabbed and un-tabbed strips. The tabbed strips (the overlay members) are then laminated to the un-tabbed strips (the underlay members) to form composite strips which are cut transversely into the individual shingles of the invention. More than one tabbed and/or untabbed strip may be fashioned into the composite laminate to increase the thickness of the finished shingles.

An important aspect of the present invention is that it permits multi-layered, laminated shingles, especially those of three or more layers, to be manufactured continuously and expeditiously from a single sheet(s) of an indefinite length. Each of the steps involved in the formation of the final roofing shingles can be carried out on the base roofing material (e.g., glass fiber mat) as the material advances continuously along the production line in the form of an elongate sheet and strips cut therefrom. The continuously performed steps comprise waterproofing the sheet, coating it with mineral granules, cutting it along its length into elongate strips, laminating these strips together to form a composite multi-level strip, and finally cutting the composite laminated strip into the individual roofing shingles. The granules may be applied before or after the sheet is cut into elongate strips, as described, for example, in U.S. Pat. No. 4,869,942, whose teachings with respect to the manufacture of trilaminated shingles are incorporated herein by reference.

In one preferred embodiment of the invention, trilaminated shingles are continuously produced from a single elongate sheet which is waterproofed and coated over its top surface with mineral granules before being cut into elongate strips. The first cut divides the sheet into two elongate strips, one much wider than the other. The narrow strip is shifted to a position underneath the wide strip so that the longitudinal centerlines of the two strips are in the same vertical plane, and the two strips are laminated together. Prior to lamination, the upper strip's undersurface which is to be bonded is advantageously coated with an adhesive material. Additionally, the lower strip may be turned upside down before lamination so that the laminate of the two strips has the granules of the top strip facing upwardly and the granules of the bottom strip facing downwardly. In the embodiment wherein the wide and narrow strips are separated before granules are applied to the former strip, as described in U.S. Pat. No. 4,869,942, the laminate's underlying strip will be uncovered by granules.

The resultant laminate is cut lengthwise into four elongate strips by three cuts, one cut along the centerline of the laminate, and one straight cut near each side edge and beyond the central bilayer portion of the laminate. The cuts near the side edges yield after separation two narrow rectangular strips while the central cut forms a repeating pattern of interdigitating doubly thick tabs so that upon separation the central portion of the laminate yields two wider strips, each having one long straight edge and alternating doubly thick tabs and cut-out portions along its other long edge. Each of the narrow strips, which desirably have the same width, is cut wide enough to completely cover the underside of each wider strip's tabs and the intervening spaces between the tabs. After separation of the four elongate strips, each narrow strip is shifted to a position wherein it underlies the double-layered tabs on a respective one of the wider strips, with a long edge of the narrow strip aligned with the outer projecting edges of the tabs. The thus positioned narrow strips are laminated to the underside of the tabs. An adhesive is suitably applied to the exposed undersides of the tabs on each of the wider separated strips prior to the lamination. The two elongate three-tiered sheets are finally cut into suitable lengths for shingles and packaged.

The continuous process thus provides a unique shingle structure having alternating tabs and cut-outs two layers in depth and an additional strip adhered along the underside of the tabs to underlie both the tab and cut-out portions. Like conventional bilaminates, this structure comprises a rectangular sheet having headlap and butt portions. When these prior art and inventive laminated shingles are installed in successive offset courses on a roof, their butt edge portions are exposed to view. Because the trilaminated shingle's butt portion is three layers in depth, with tabs and cut-outs two layers deep and an additional layer under both the tabs and cut-outs, the shingle presents a bulky appearance that closely approaches that presented by wood and tile shingles.

The extra-thick appearance of the trilaminated shingles is enhanced considerably through the coloration technique of the invention. The coloration is readily accomplished during the above-described continuous production of the shingles from a single elongate sheet. After the continuously advancing sheet is waterproofed and its top surface is coated with an adhesive material, colored granules are strategically applied in three elongate strips to the top surface. A first coating of colored granules is applied to that elongate section of the sheet which becomes the tabbed butt portions of the two complementary overlays formed as above, while second and third coatings of differently colored granules are applied to the two elongate narrow sections of the sheet which become the strips underlying the tabs and intervening spaces.

DESCRIPTION OF THE DRAWINGS

The invention will now be described with reference to the accompanying drawings in which.

DETAILED DESCRIPTION OF THE INVENTION

Figure 1:
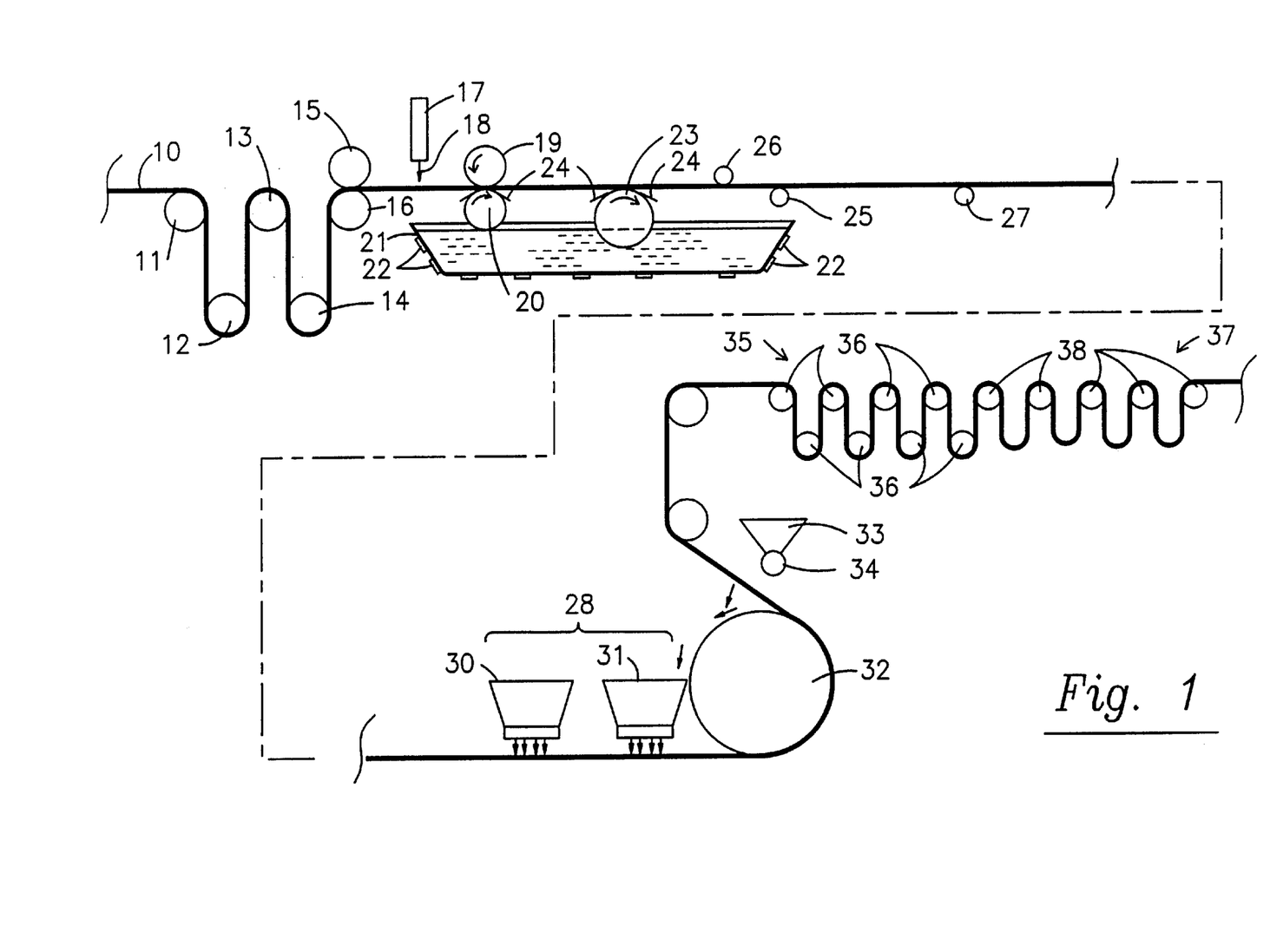
FIGS. 1 and 3 are schematic elevational views of one form of apparatus whereby laminated shingles may be manufactured according to this invention.
Figure 3:
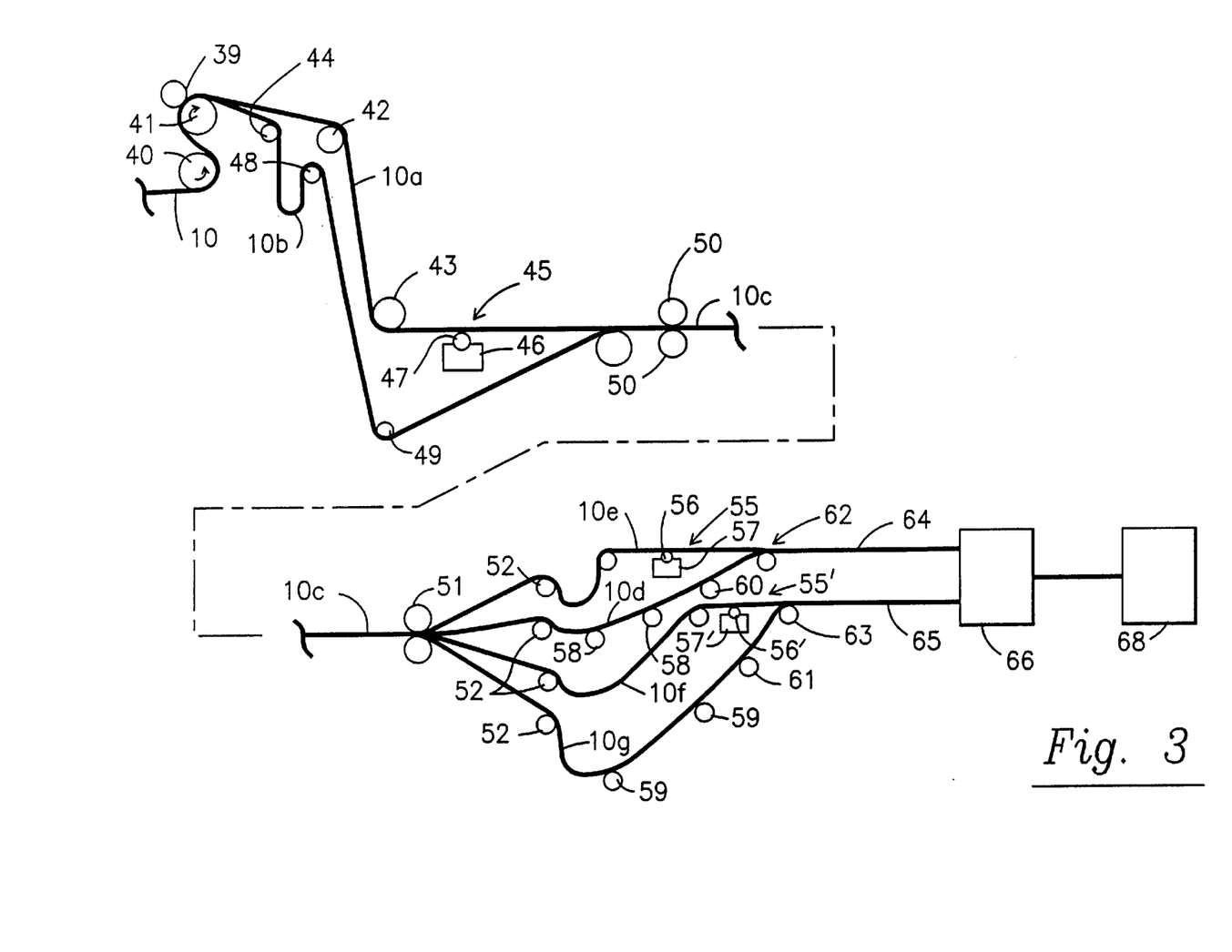

Referring now to the drawings and more specifically to FIGS. 1 and 3 thereof, there is shown diagrammatically an overall process for forming multi-layered roofing shingles according to the instant invention. A rectangular sheet or web 10 of an indefinite length is unwound from a roll (not shown) and fed along the production line. Sheet 10 is preferably a mat of glass fibers but may also be fabricated from organic felt or other types of base material. The glass mat is generally about 40 to 48 in wide, and generally weighs from about 1.35 to 3.00 lbs/100 ft.$^2$ After sheet 10 is fed over a series of loopers 11–14 and between a pair of tension rollers 15 and 16 for uniform tensioning, it is then passed to a station for the application of filled asphalt coating. Discharge pipe 17 supplies a layer of the asphalt coating 18 to the upper surface of sheet 10 just before the nip of rotating rolls 19 and 20. Reservoir 21 is placed below the coating area to capture runover asphalt from the operation for application to the sheet by back coating roll 20 immersed in the asphalt of reservoir 21. Nip rolls 19 and 20 coact to apply the appropriate weight of asphalt coating to the sheet, with the nip of the rolls providing pressure to ensure that the asphalt has impregnated the sheet properly. Heating units 22 keep the coating asphalt at the proper temperature for application.

Downstream of roll 20 is another back coating roll 23, which is also immersed in reservoir 21 for pickup of liquid asphalt and deposition on the back surface of sheet 10. Sheet 10 may be coated by both rolls, as shown in FIG. 1, or it may be subjected to a single treatment by one or the other of the rolls. Excess asphalt is advantageously wiped from the surface of the back coating roll(s) by a doctor knife(s) 24 or the like, installed on either or both sides of the back coating roll(s) to ensure uniform application and avoid excesses of the asphalt. Downstream of the back coating application there is a doctor blade or knife 25 or the like which removes excess coating from the back or under surface of sheet 10. Sheet 10 is further acted upon by a smoothing roll 26 and a carrier roll 27, which rolls are generally heated.

Stabilized asphalt coating 18 suitably has a softening point as measured by ASTM D36 of from about 195° to 260° F., more preferably from about 215° to 235° F., and is usually applied in an amount from about 50 to 70 pounds, more preferably from about 55 to 65 pounds, per 100 square feet of sheet 10. The coating is advantageously maintained at about 380° to 450° F. before application to the sheet.

After the coating step and while the coating material is still hot, soft and tacky, coated sheet 10 passes beneath surfacing apparatus 28 from which decorative granules are deposited on the upper surface of the sheet. Apparatus 28 includes a series of bins filled with mineral granules and positioned above the longitudinally moving sheet. This known type of roofing machinery is equipped for selectively depositing the mineral granules contained in the bins onto the adhesive upper surface of sheet 10 to effectuate the inventive coloration. Apparatus 28 is outfitted with enough bins to hold each collection of granules to be applied to the sheet in the formation of the overall color pattern being developed on the sheet.

Figure 2:
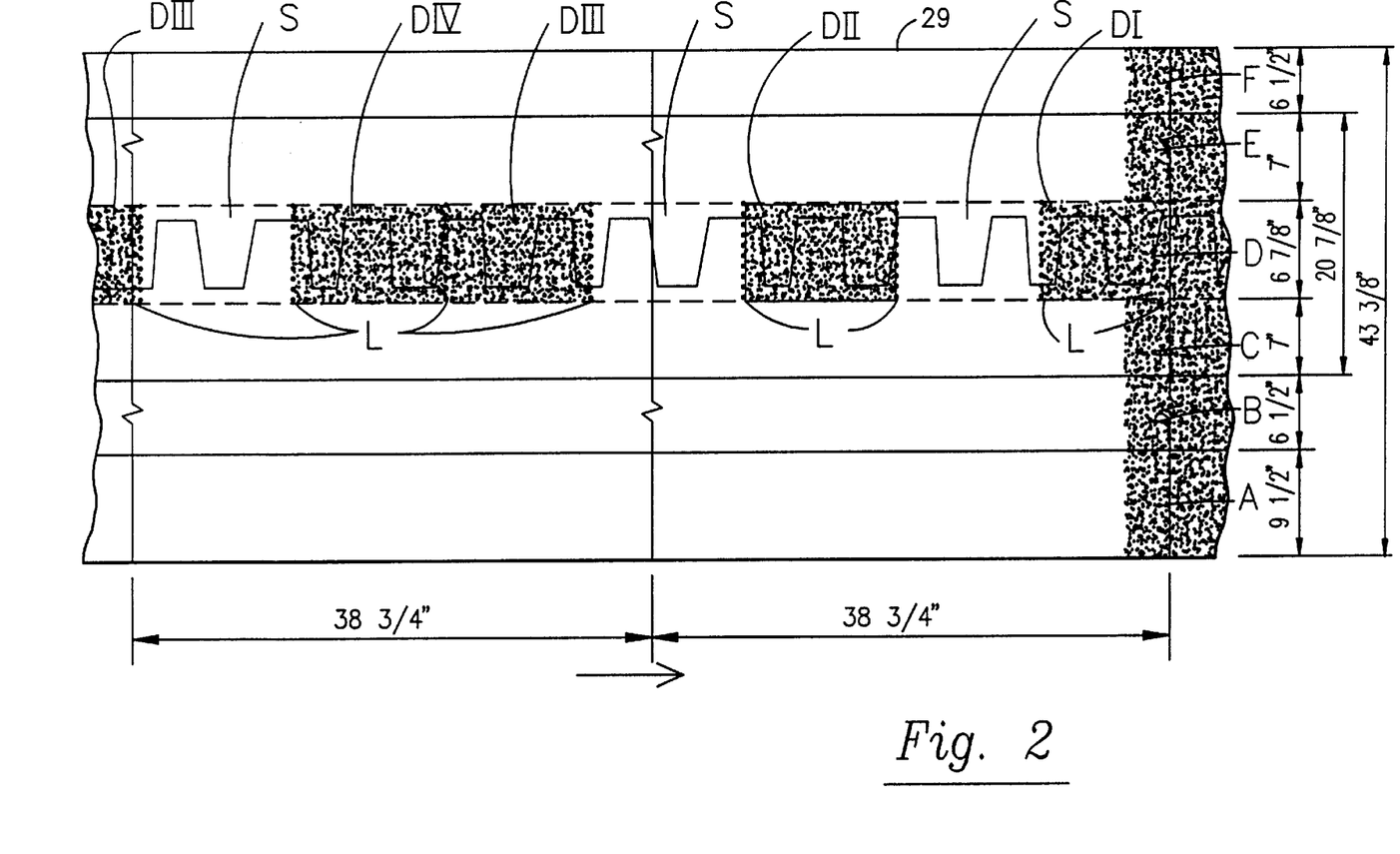
FIG. 2 is a top plan view of a sheet of fibrous material partially coated with granules in accordance with the invention.

The formation of a preferred distinctive color pattern in the manufacture of a trilaminated shingle of the invention can be illustrated with reference to the section 29 of sheet 10 illustrated in FIG. 2. In the mineral granule treatment schematically shown in FIG. 2, sheet 10 is moving longitudinally under apparatus 28 in the direction of the arrow. The granule deposition can be understood with reference to the lines extending longitudinally and transversely over the surface of sheet section 29, as shown in FIG. 2. The four solid lines running longitudinally between the two side edges of the sheet correspond to the cuts to be subsequently made in the formation of the component laminae of the shingle, as set forth below. It is seen that there will be three straight cuts and one zigzagged cut. The cutting pattern of FIG. 2 is merely one of many such patterns which could be used to produce the component laminae. The two dashed lines extending lengthwise to either side of the zigzagged line do not correspond to eventual cuts but, in conjunction with the other five straight and parallel lines extending lengthwise, including the side edges, demarcate six zones which are designated zones A–F. As indicated in FIG. 2, the widths of the zones across sheet 10 are as follows: zone A—9½"; zones B and F—6½"; zones C and E—7"; and zone D—6⅞". These six zones extend over the entire length of sheet 10. The overall width of sheet 10 as well as the number and widths of the zones to be colored can vary depending on factors such as the capacity of the apparatus and the number and size of the shingles being produced per unit length of the sheet.

The granule discharges which are applied onto the six zones of section 29 are made from the above-mentioned bins of apparatus 28. The bins are contained in two applicator compartments, a so-called blend box 30 and spill box 31. In progressing along the production line, sheet 10 first passes under applicator box 30 which deposits granules onto zone D, and then under applicator 31, which deposits granules onto all of the zones. As shown in FIG. 2, the far right side of section 29 of sheet 10 has passed under both applicator boxes 30 and 31 and thus has granules covering all of the zones, while the left-hand side, having passed under only applicator box 30, has the granules covering only selected portions of zone D. As sheet 10 progresses further along the production line, the uncovered zones of section 29 will, of course, become covered by granules discharged from applicator box 31.

The distinctive variation in color which distinguishes the individual shingles to be cut from sheet 10 is achieved by depositing onto zone D mineral granules whose color differs strikingly from that of the granules subsequently deposited onto zones B and F. In the finished shingles which are situated on a roof deck the exposed granule-coated layers cut from zone D overlie the exposed granule-coated layers cut from zones B and F, as is more fully discussed below. The viewer will perceive on the roof a plurality of tabs from zone D whose color vividly emphasizes them and so to speak "elevates" them from the differently colored underlying strips from zone B or zone F.

In a preferred embodiment of the invention, the roofs exposed layers from zone D are in the form of an effectively random series of differently colored portions. To form this random pattern, applicator (blend) box 30 is equipped with a group of bins, each of which contains variously colored granules for application to zone D. The contents of each bin advantageously consist of blends of the colored granules. The deposition of blends is found to protect against the surface flaws encounterable with the use of singly colored granules. There must be a sufficient number of these bins to produce a random look on the covered roof surface. Suitably, there are at least four such bins each holding different color blends of mineral granules. Applicator box 30 of FIG. 1 has four such bins from which the blends of the contained mineral granules are selectively dropped onto the upper surface of sheet 10 as it passes beneath these bins. The average of the colored granules found in these four bins is contained in a bin of applicator box 31 for the follow-up treatment of zone D described below. This average or composite of all the colored granules not only adds an aesthetically pleasing color variation but also permits the utilization of the inevitable accumulation of the spilled granules from the other bins.

The selective dropping of mineral granules from the bins of applicator box 30 results in deposited bands of mineral granules (so-called "color drops") on zone D. The first four such bands of FIG. 2, which are designated DI through DIV, are bordered by dotted lines L extending across zone D. The deposition from applicator box 30 is interrupted at various randomly located places along zone D, yielding spaces designated S, which are uncovered by granules.

After its passage under applicator box 30, sheet 10 next passes under applicator (spill) box 31, which is divided into a number of bins supplied with granular material and equipped for the simultaneous application of the granules across sheet 10 to complete the coverage of zones A to F. One of these bins continuously delivers to zone D a blend of colored granules which represent the average of the granules deposited from the four bins of applicator box 30. The spaces designated S of zone D become covered with this average blend. Additionally, granules of this blend fill in spots left uncovered in bands DI to DIV after the surfacing by applicator box 30.

Applicator boxes 30 and 31 thus together provide on zone D a series of color drops or bands DI through DIV and S, each band having a variable length and a color which contrasts with the color of the mineral granules in the bands adjacent thereto in the completely granule-covered sheet. In the embodiment illustrated in FIG. 2, each of the color drops onto zone D (bounded by a pair of dotted lines) is about 11 inches lengthwise along sheet 10. Applicator boxes 30 and 31 are operated to alternate the color drops from the five mineral granule bins in an effectively random fashion. The term "effectively random fashion" is used since the machinery is constructed to set up a pattern of alternating color drops which for the FIG. 2 embodiment is repeated only after 36 such color drops. This 36 drop cycle results in a pattern of such color drops which, for practical purposes in the final roof covering of the invention, is undetectable visually from an entirely random, nonrepeating pattern.

As shown in FIG. 2, the first six designated color blends or bands from the five granule-containing bins of applicator boxes 30 and 31 discharging onto sheet 10 are DI, S, DII, S, DIII and DIV in order from right to left. Color drop S, which constitutes the average color blend which would result from a combination of the colored granules of drops DI, DII, DIII and DIV, is applied twice from its bin in this group of six drops. As sheet 10 advances, applicator boxes 30 and 31 apply this same group of six color blends, viz. DI to DIV and S (deposited twice), as a set over and over to zone D but with the sequence of the six drops changed from each set to the next. After the application of six differently ordered sets or a total of thirty-six color drops, the cycle of these six sets is repeated on and on over the entire length of sheet 10. The result of this coloring process is an effectively random, nonrepeating color pattern on the shingles'overlying laminae derived from zone D. As further illustrated below, these colored overlays contribute to highly appealing composites when used in combination with underlying shims derived by the treatment of zones B and F with a coating of differently colored granules.

Continuously and concurrently with dropping granules onto zone D, applicator box 31 drops onto each of zones B and F a granular surfacing material which may be the same or different for each of these two zones. Applicator box 31 is suitably equipped with one or two bins for granule deposition on zones B and F. The granules deposited on zones B and F have a distinctively different coloration from that of the granules deposited on zone D. As noted above, zones B and F of sheet 10 form, in the finished shingles, strips or shims underlying the tabs formed from zone D. A highly pleasing roof covering is obtained when the above-described formation of alternating color drops on zone D is accompanied by the treatment of both zones B and F with blended granules whose coloration is uniform over the entire length of sheet 10 and is the same for both these zones but distinctly different from that of zone D. The difference in coloration to contrast zones B and F from zone D can be achieved in various ways, such as by applying to zones B and F or to zone D granules of a color(s) and/or hue(s) which is(are) not used on zone D or zones B and F, respectively. Even when zones B and F and zone D have one or more granule colors in common, a vivid contrast still can be obtained through the use on the zones of a sufficient amount of at least one unshared granule color and/or hue. However, there is no application on zones B and F of a plurality of horizontal striations of colored granules to provide a color gradation and a vivid contrast on the exposed surface of the strips underlying the tabs of the finished shingles. This technique, which is described in U.S. Pat. No. 5,666,776, is not used in the present invention.

Combinations of colored granules used for five preferred shingle colorations of the invention are listed in the following Table 1. The designated amounts of the granules are applied as above described to zones D, B and F for ultimate surfacing of the overlay/shim composites formed from these zones. The order of presentation in Table 1 of the six colored blends (DI, S, DII, S, DIII and DIV) of zone D is the order of their discharge onto sheet 10, as shown in FIG. 2. The same six colored blends are applied repeatedly in the production of the shingles, with the order of their deposition varied as previously explained. The weight percentages of colored granules indicated in Table 1 for zones B and F are the same for both these zones. While the color combinations shown in the table are preferred embodiments, a multitude of other combinations are of course possible and fall within the scope of the present invention.

The color coordinates of the granule blends of Table 1 were measured by a HunterLab Colorimeter Model No. D25. The brightness ("L"), green to red ("a") and blue to yellow ("b") values obtained are given in the following Table 2. Table 2 also shows the average variation in color coordinate values between zone D and zones B and F. The average variation for each coordinate is obtained by subtracting the value for color drop S of zone D from the value for zones B and F. The value of color drop S is chosen for the calculation because color drop S constitutes the average color blend on zone D and accordingly the color coordinates of drop S are the average coordinates for the zone D drops. The distinctive difference in coloration between zone D, which becomes the shingles' overlay, and zones B and F, which become the shingles' shim, is evidenced by the color coordinate differences set forth in Table 2. Where, as in conventional bilaminated shingles, the shim is surfaced by a blend of colored granules which constitutes the average of all the colored granules surfacing the overlay, there is on the average no variation in color coordinates between the shingles' overlay and shim portions and accordingly these bilaminated shingles lack the appealing color contrasts distinguishing the shingles of the present invention.

TABLE 1

EXAMPLES OF PRODUCT COLORS

| Shingle Color | Granule Color Family (Overlay/Shim) | % By Weight | | | | | | Zones |
|---|---|---|---|---|---|---|---|---|
| | | Zone D | | | | | | |
| | | DI | S | DII | S | DIII | DIV | B & F |
| I | Overlay: | | | | | | | |
| | Black | 31.5 | 36.0 | 49.5 | 36.0 | 31.5 | 31.5 | — |
| | Light Black | 4.5 | 12.6 | 13.5 | 12.6 | 27.0 | 4.5 | — |
| | Gray | 40.5 | 30.6 | 18.0 | 30.6 | 31.5 | 31.5 | — |
| | Red | 13.5 | 10.8 | 9.0 | 10.8 | — | 22.5 | — |
| | Light Gray (FR) | 10.0 | 10.0 | 10.0 | 10.0 | 10.0 | 10.0 | — |
| | Shim: | | | | | | | |
| | Black | — | — | — | — | — | — | 43.2 |
| | Gray | — | — | — | — | — | — | 46.8 |
| | Light Gray (FR) | — | — | — | — | — | — | 10.0 |
| II | Overlay: | | | | | | | |
| | Black | 13.5 | 22.5 | 27.0 | 22.5 | 31.5 | 13.5 | — |
| | Brown | 9.0 | 22.5 | 27.0 | 22.5 | 49.5 | 9.0 | — |
| | Buff | 18.0 | 4.5 | — | 4.5 | — | — | — |
| | Dark Accent | 49.5 | 40.5 | 36.0 | 40.5 | 9.0 | 67.5 | — |
| | Brown (FR) | 10.0 | 10.0 | 10.0 | 10.0 | 10.0 | 10.0 | — |
| | Shim: | | | | | | | |
| | Black | — | — | — | — | — | — | 22.5 |
| | Brown | — | — | — | — | — | — | 40.5 |
| | Tan | — | — | — | — | — | — | 27.0 |
| | Brown (FR) | — | — | — | — | — | — | 10.0 |
| III | Overlay: | | | | | | | |
| | Black | 13.5 | 22.5 | 27.0 | 22.5 | 31.5 | 13.5 | — |
| | Brown | 9.0 | 22.5 | 27.0 | 22.5 | 49.5 | 9.0 | — |
| | Buff | 18.0 | 4.5 | — | 4.5 | — | — | — |
| | Dark Accent | 49.5 | 40.5 | 36.0 | 40.5 | 9.0 | 67.5 | — |
| | Brown (FR) | 10.0 | 10.0 | 10.0 | 10.0 | 10.0 | 10.0 | — |
| | Shim: | | | | | | | |
| | Black | — | — | — | — | — | — | 13.5 |
| | Brown | — | — | — | — | — | — | 7.2 |
| | Cream Buff | — | — | — | — | — | — | 5.4 |
| | Dark Accent | — | — | — | — | — | — | 53.1 |
| | Gray | — | — | — | — | — | — | 10.8 |
| | Brown (FR) | — | — | — | — | — | — | 10.0 |
| IV | Overlay: | | | | | | | |

TABLE 1-continued

EXAMPLES OF PRODUCT COLORS

| Shingle Color | Granule Color Family (Overlay/Shim) | % By Weight Zone D | | | | | | Zones B & F |
|---|---|---|---|---|---|---|---|---|
| | | DI | S | DII | S | DIII | DIV | |
| | Black | 18.0 | 13.5 | 18.0 | 13.5 | 18.0 | — | — |
| | Brown | — | 7.2 | 18.0 | 7.2 | 6.3 | 6.3 | — |
| | Cream Buff | 13.5 | 5.4 | — | 5.4 | — | 6.3 | — |
| | Dark Accent | 31.5 | 53.1 | 54.0 | 53.1 | 65.7 | 59.4 | — |
| | Gray | 27.0 | 10.8 | — | 10.8 | — | 18.0 | — |
| | Brown (FR) | 10.0 | 10.0 | 10.0 | 10.0 | 10.0 | 10.0 | — |
| | Shim: | | | | | | | |
| | Black | — | — | — | — | — | — | 16.2 |
| | Light Brown | — | — | — | — | — | — | 46.8 |
| | Brown | — | — | — | — | — | — | 9.0 |
| | Dark Accent | — | — | — | — | — | — | 18.0 |
| | Brown (FR) | — | — | — | — | — | — | 10.0 |
| V | Overlay: | | | | | | | |
| | Black | 13.5 | 22.5 | 27.0 | 22.5 | 31.5 | 13.5 | — |
| | Brown | 9.0 | 22.5 | 27.0 | 22.5 | 49.5 | 9.0 | — |
| | Buff | 18.0 | 4.5 | — | 4.5 | — | — | — |
| | Dark Accent | 49.5 | 40.5 | 36.0 | 40.5 | 9.0 | 67.5 | — |
| | Brown (FR) | 10.0 | 10.0 | 10.0 | 10.0 | 10.0 | 10.0 | — |
| | Shim: | | | | | | | |
| | Black | — | — | — | — | — | — | 16.2 |
| | Light Black | — | — | — | — | — | — | 46.8 |
| | Brown | — | — | — | — | — | — | 9.0 |
| | Dark Accent | — | — | — | — | — | — | 18.0 |
| | Brown (FR) | — | — | — | — | — | — | 10.0 |

Note: FR = fungus/algae-resistant granules.

TABLE 2

COLORIMETER COLOR COORDINATE MEASUREMENTS

| Shingle Color | Shingle Component | Color Blend | Color Blends Color Coordinates | | | Avg. Color Coordinate Variation Zone D Compared to Zones B & F | | |
|---|---|---|---|---|---|---|---|---|
| | | | "L" | "a" | "b" | "L" | "a" | "b" |
| I | Overlay (Zone D) | DI | 30.1 | 1.1 | −0.5 | — | — | — |
| | | S | 28.5 | 0.9 | −0.4 | — | — | — |
| | | DII | 26.3 | 0.6 | −0.1 | — | — | — |
| | | S | 28.5 | 0.9 | −0.4 | — | — | — |
| | | DIII | 28.7 | 0.8 | −1.2 | — | — | — |
| | | DIV | 29.1 | 2.1 | 0.7 | — | — | — |
| | Shim (Zones B & F) | B & F | 29.8 | −0.4 | −1.8 | +1.3 | −1.3 | −1.4 |
| II | Overlay (Zone D) | DI | 26.2 | 1.0 | 5.6 | — | — | — |
| | | S | 23.6 | 1.2 | 3.6 | — | — | — |
| | | DII | 22.4 | 0.9 | 2.5 | — | — | — |
| | | S | 23.6 | 1.2 | 3.6 | — | — | — |
| | | DIII | 21.3 | 1.5 | 2.4 | — | — | — |
| | | DIV | 24.9 | 0.8 | 3.5 | — | — | — |
| | Shim (Zones B & F) | B & F | 23.1 | 2.9 | 4.7 | −0.5 | +1.7 | +1.1 |
| III | Overlay (Zone D) | DI | 26.2 | 1.0 | 5.6 | — | — | — |
| | | S | 23.6 | 1.2 | 3.6 | — | — | — |
| | | DII | 22.4 | 0.9 | 2.5 | — | — | — |
| | | S | 23.6 | 1.2 | 3.6 | — | — | — |
| | | DIII | 21.2 | 1.5 | 2.4 | — | — | — |

TABLE 2-continued

COLORIMETER COLOR COORDINATE MEASUREMENTS

| Shingle Color | Shingle Component | Color Blend | Color Blends Color Coordinates | | | Avg. Color Coordinate Variation Zone D Compared to Zones B & F | | |
|---|---|---|---|---|---|---|---|---|
| | | | "L" | "a" | "b" | "L" | "a" | "b" |
| | | DIV | 24.9 | 0.8 | 3.5 | — | — | — |
| | Shim (Zones B & F) | B & F | 27.6 | 0.8 | 3.4 | +4.0 | −0.4 | −0.2 |
| IV | Overlay | DI | 31.7 | 0.7 | 3.4 | — | — | — |
| | (Zone D) | S | 27.6 | 0.8 | 3.4 | — | — | — |
| | | DII | 24.4 | 0.7 | 3.3 | — | — | — |
| | | S | 27.6 | 0.8 | 3.4 | — | — | — |
| | | DIII | 24.9 | 0.6 | 3.4 | — | — | — |
| | | DIV | 30.1 | 0.8 | 3.6 | — | — | — |
| | Shim (Zones B & F) | B & F | 22.6 | 0.2 | 1.3 | −5.0 | −0.6 | −2.1 |
| V | Overlay | DI | 26.2 | 1.0 | 5.6 | — | — | — |
| | (Zone D) | S | 23.6 | 1.2 | 3.6 | — | — | — |
| | | DII | 22.4 | 0.9 | 2.5 | — | — | — |
| | | S | 23.6 | 1.2 | 3.6 | — | — | — |
| | | DIII | 21.2 | 1.5 | 2.4 | — | — | — |
| | | DIV | 24.8 | 0.8 | 3.5 | — | — | — |
| | Shim (Zones B & F) | B & F | 22.6 | 0.2 | 1.3 | −1.0 | −1.0 | −2.3 |

Color Coordinates:
"L" = brightness, black (0) to white (100)
"a" = green (−) to red (+)
"b" = blue (−) to yellow (+)
Note: Color differences occur when "L" > 1.0, "a" > 0.6, "b" > 0.6.

Applicator box 31 is further equipped with one or more bins for application, simultaneously with the application of the continuous layers of granules to zones B, D and F, of continuous layers of granules to zones A, C and E. As will hereinafter be understood, the material of the latter three zones form portions which are not visible in the completely constructed and installed shingles of the invention. Accordingly, the granules deposited on these three zones suitably are low cost materials.

As illustrated in FIG. 1, after the stream of granules is discharged from applicator box 31 onto sheet 10, the sheet goes around a slate drum 32 which functions to embed the granular material in the top asphalt coating. In the continued passage of the surfaced sheet 10, excess granules fall off from the sheet into applicator box 31 from which they are reapplied onto the sheet. The back of the sheet then comes under hopper 33 containing talc, mica dust, or other composition capable of rendering the back of the sheet non-cementitious. The material from hopper 33 is uniformly distributed over the back of the sheet by means of a distributing roll 34. The coated roof sheet at this point generally weighs from about 80–110 lbs/100 ft.$^2$ Sheet 10 next passes through a cooling section 35 which may simply involve a water spray or a series of cooling rolls 36 around which sheet 10 is looped. At the finish looper station 37, the sheet is fed over a series of rolls 38 which control its speed as it advances to the slitter (see FIG. 3). After embedment of the granular material on sheet 10 by slate drum 32 and prior to slitting of the sheet, adhesive strips (not shown) are desirably applied to the front or back of the sheet. In the final roof covering, this adhesive material acts as a self-sealing means for attaching the shingles in one horizontal course to those in the next upper or lower course. At this interval during shingle production, release tape (also not shown) should be affixed to those sheet portions which in the finished and packaged shingles will come in contact with the above-mentioned adhesive strips of adjacent shingles. Sticking in the package is thereby prevented.

As shown at the left-hand edge of FIG. 3, the cooled sheet is pulled by rolls 40 and 41 and divided lengthwise by a slitter 39 into two portions, a wide sheet 10a and a narrow sheet 10b. The cutting may be accomplished by any suitable means, such as by a cutting wheel. Advantageously, the original 43⅜ inch wide sheet of the preferred embodiment of FIG. 2 is cut along the line separating zone A from the remainder of sheet 10 or more specifically from zones B through F. Accordingly, for this embodiment slitter 39 cuts sheet 10 into a sheet 10a which is 33⅞ inches wide and a sheet 10b which is 9½ inches wide. At this point both the main sheet 10a and the narrow strip 10b have granules embedded on their upper surfaces.

Sheets 10a and 10b are pulled and guided along by conventional rollers 42–44. The wide sheet 10a is fed over a back coater 45 which comprises a tray 46 which contains asphalt and a drum 47, whose lower surface rotates in the asphalt tray 46. Drum 47 applies asphalt from the tray to the central area of the back side of wide sheet 10a to form an adhesive coating zone about 9 inches wide to receive strip 10b. The adhesive may be applied as a continuous layer or as strips.

Strip 10b passes up over a guide bar 48 and then across to another guide bar 49, and is shifted underneath strip 10a so that the centerline of the narrower strip is below and coincident with the centerline of the wider strip. With their centerlines so aligned and their granule-covered surfaces facing upwardly, the two strips are brought into contact and strip 10b is pressed against the asphalt coated underside of main strip 10a by laminating rolls 50 to form a composite of the two strips having one layer of granules surfacing the composite's upper surface and another layer of granules sandwiched between strips 10a and 10b of the composite. In a further embodiment of the invention, strip 10b is twisted in its passage from guide bar 48 to guide bar 49 so that it is turned upside down and its back without granules faces upwardly for bonding to the back side of strip 10a. This results in the formation of a laminated composite of the two strips with granules on the opposed outer faces.

Figure 4:
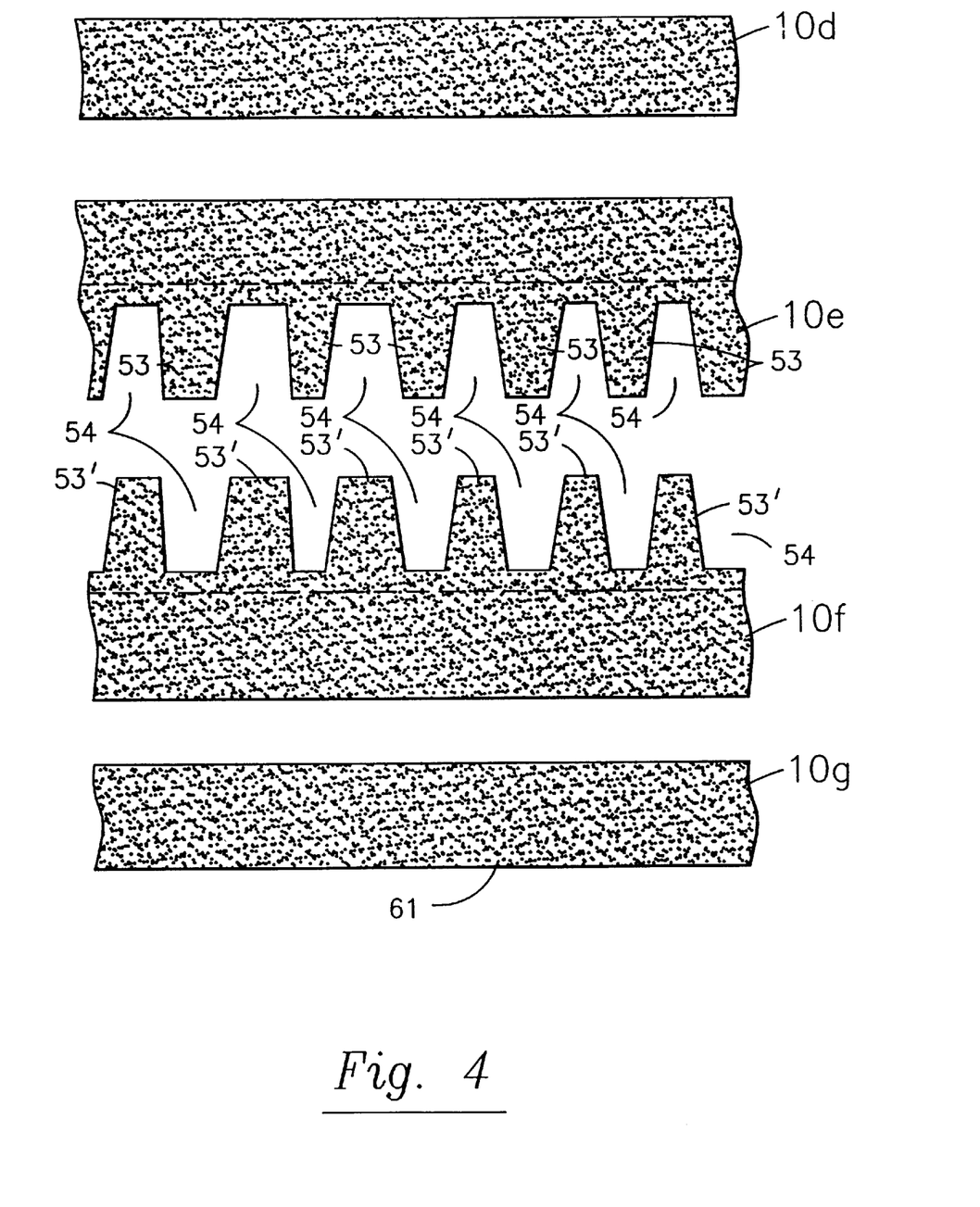
FIG. 4 is a top plan view of separated sheets after cutting and passing through a separator.

The laminated combination 10c of strips 10a and 10b is fed into a cutting station 51 which is equipped to make three lengthwise cuts along this laminate. Each cutter suitably comprises an upper cutting wheel and a lower anvil roll. The cuts separate the laminated sheet 10c into four parts of indefinite length, which are separated at station 52. Station 52 desirably has drums which are positioned to rotate at angles with respect to each other so that the four strips will proceed on separate paths along the production line. FIG. 4 provides a top view illustrating four strips 10d–10g separated from a section of laminate 10c. These four strips are beneficially derived by making the three cuts along the solid zigzagged line and adjacent two solid lines (to either side of the zigzagged line) illustrated on sheet section 29 of FIG. 2. The cut along the zigzagged line results in a series of interdigitating tabs 53,53' and intermediate cut-outs 54 over the length of strips 10e and 10f. With reference to zones A to F of sheet 10, it is seen that separated strips 10d and 10g correspond to zones F and B, respectively, and separated strips 10e and 10f correspond to complementary strips from zones C, D and E. Each of strips 10e and 10f has tabs which are two layers thick because of the previous lamination of zone A underneath the central portion of zones C, D and E. Advantageously, strips 10e and 10f are each 13¼ inches wide and strips 10d and 10g are each 6½ inches wide.

Strips 10e and 10f continue on to adhesive applicators 55,55'. The upper adhesive applicator 55 comprises an applicator drum 56 and a trough 57 in which the applicator drum is partially immersed. Laminated strip 10e rides over the upper surface of drum 56 which applies an adhesive from trough 57 to the underside of tabs 53 of the strip 10e. Similarly, the lower applicator 55', with drum 56' and trough 57', applies adhesive to the underside of tabs 53' of strip 10f.

After being cut from laminated sheet 10c at cutting station 51, strips 10d and 10g are conveyed over conveyors 58 and 59 and shifted by shim shifters 60 and 61 so that they become aligned with the outer edges of the tabs of strips 10e and 10f, respectively, thus underlying both the tabs and the cut-out portions of the latter two strips. Each of the shim shifters suitably comprises an offset roll which rotates around an axis at an angle with respect to conveyor 58 or 59.

Strips 10d and 10g are laminated to the tabs 53 and 53' of strips 10e and 10f, respectively, by laminating drums 62 and 63. These drums provide surfaces against which the strips 10d and 10g are held against the tabs of the overlying strips 10e and 10f in the formation of three-layered strips 64 and 65. After production of composite strips 64 and 65, they are conveyed to a cutting station 66, where each is cut transversely of its length into shingles of the desired length by transverse cutters or any other suitable cutting mechanism. An appropriate length is 38¾ inches, as shown in FIG. 2 for two portions of sheet section 29. Composite strips 64 and 65 may be cut individually or they may be positioned one above the other to be cut jointly into the shingles of the invention. The resulting shingles are conveyed for packaging to station 68.

We claim:

1. A method of continuously producing a plurality of laminated shingles comprising the steps of:
   (a) continuously advancing an indefinite length of a fibrous sheet,
   (b) waterproofing the sheet,
   (c) adhering granules to the upper surface of the sheet, including a first, second and third coating of colored granules to cover a first, second and third rectangular strip, respectively, of the sheet, each resultant colored strip having a predetermined width and an indefinite length, and the second and third colored strips having a substantially identical shape, the first coating being applied between the second and third coatings, the second coating being applied along a side edge of the sheet and the third coating being applied inwardly from the opposite side edge of the sheet so as to leave along the opposite side edge an indefinitely long rectangular strip which is uncovered by the adhered colored granules and has a predetermined width substantially less than the width of the remainder of the sheet and wider than the first colored strip, the first coating comprising a first aggregate of colored granules selected from a first group of granules having one or more colors and/or hues and the second and third coatings each comprising a second aggregate of colored granules selected from a second different group of granules having one or more colors and/or hues, there being present among at least one of the aggregates a multitude of granules having at least one color and/or hue thereof not present among the granules of the other aggregate, the second and third colored strips having no plurality of horizontal striations,
   (d) cutting from the sheet the indefinitely long rectangular strip uncovered by the colored granules adhered in step (c),
   (e) shifting the strip cut from the sheet in step (d) to a position underneath the remaining sheet so as to place the longitudinal centerline of the shifted strip in the same vertical plane as the centerline of the first colored strip with the colored granules of the first colored strip facing upwardly,
   (f) laminating together the upper first colored strip and lower shifted strip as positioned in step (e) to form a laminated sheet,
   (g) converting the laminated sheet formed in step (f) into four indefinitely long strips by making
      (A) a first elongate cut through the bilayer portion of the laminated sheet to form a repeating pattern of interdigitating tabs in the bilayer portion, and
      (B) second and third straight elongate cuts beyond and parallel to each side edge of the first colored strip and along the inner boundary of the second and third colored strips, respectively, so as to divide the sheet into two elongate overlay strips of substantially identical shape, each overlay strip having one long straight edge and a bilayer portion having alternating colored tabs and cut-out portions along its other long edge, and the second and third colored strips, each of the second and third colored strips being sufficiently wide to cover the cut-outs of each bilayer portion,
   (h) shifting each of the second and third colored strips after the cutting of step (g) to a position wherein it underlies the colored tabs on a respective one of the bilayer portions, a long edge of each underlying strip being aligned with the outer projecting edges of the tabs of the respective bilayer portion, and the colored granules on each bilayer portion and underlying strip facing upwardly,
   (i) laminating together each bilayer portion and underlying strip as positioned in step (h), and
   (j) cutting the elongate laminates into preset lengths to form a plurality of shingles, whereby each shingle has alternating doubly thick tabs and cut-outs underlaid by the underlying strip along one long edge.

2. The method of claim 1 comprising, prior to formation of the two elongate overlay strips, laminating at least one additional indefinitely long rectangular strip to the underside of the bilayer portion, the surface of each additional strip being coextensive with the surface of the bilayer portion so as to form two elongate overlay strips having alternating colored tabs which are at least triply thick.

3. The method of claim 1 wherein the indefinitely long rectangular strip cut from the sheet in step (d) has low cost granules adhered to its upper surface.

4. The method of claim 3 wherein the first aggregate of colored granules are adhered so as to present a random or non-random color pattern on the first colored strip and the second aggregate of colored granules are adhered so as to present a random or non-random color pattern on the second and third colored strips.

5. The method of claim 3 wherein the first aggregate of colored granules are adhered so as to present a random color pattern on the first colored strip and the second aggregate of colored granules are adhered so as to present a non-random color pattern on the second and third colored strips.

* * * * *